US006878193B2

(12) United States Patent
Kasmark, Jr.

(10) Patent No.: US 6,878,193 B2
(45) Date of Patent: Apr. 12, 2005

(54) FILTER MATERIAL AND METHOD OF MAKING SAME

(76) Inventor: James W. Kasmark, Jr., 25712 D'Hondt Ct., Chesterfield, MI (US) 48051

(*) Notice: Subject to any disclaimer, the term of this patent is extended or adjusted under 35 U.S.C. 154(b) by 0 days.

(21) Appl. No.: 10/340,972

(22) Filed: Jan. 13, 2003

(65) Prior Publication Data

US 2004/0134355 A1 Jul. 15, 2004

(51) Int. Cl.[7] ............................ B01D 46/10; B01D 53/04
(52) U.S. Cl. ............................ 96/135; 96/154; 55/512; 55/528
(58) Field of Search ........................ 96/117, 117.5, 96/135, 153, 1, 54; 55/512, 527, 528

(56) References Cited

U.S. PATENT DOCUMENTS

| | | | | |
|---|---|---|---|---|
| 3,015,367 A | * | 1/1962 | Smith et al. ................... | 96/135 |
| 3,019,127 A | * | 1/1962 | Czerwonka et al. ......... | 428/338 |
| 3,744,091 A | | 7/1973 | Wood | |
| 4,035,121 A | | 7/1977 | Wood | |
| 4,160,059 A | * | 7/1979 | Samejima .................... | 442/411 |
| 4,403,374 A | | 9/1983 | Wood | |
| 4,429,001 A | * | 1/1984 | Kolpin et al. ................ | 442/340 |
| 4,433,024 A | * | 2/1984 | Eian ............................ | 428/198 |
| 4,699,681 A | * | 10/1987 | Kasmark et al. ............. | 156/264 |
| 4,755,178 A | | 7/1988 | Insley et al. | |
| 4,917,714 A | * | 4/1990 | Kinsley, Jr. .................. | 55/524 |
| 4,917,943 A | | 4/1990 | Tesch | |
| 5,328,758 A | * | 7/1994 | Markell et al. .............. | 442/351 |
| 5,338,340 A | | 8/1994 | Kasmark, Jr. et al. | |
| 5,350,620 A | * | 9/1994 | Sundet et al. ................ | 428/172 |
| 5,486,410 A | * | 1/1996 | Groeger et al. .............. | 442/353 |
| 5,569,489 A | | 10/1996 | Kasmark, Jr. | |
| 5,662,728 A | * | 9/1997 | Groeger ........................ | 96/153 |
| 6,024,782 A | * | 2/2000 | Freund et al. ................ | 96/154 |
| 6,059,860 A | * | 5/2000 | Larson ......................... | 95/117 |
| 6,423,123 B1 | * | 7/2002 | Rosenberg et al. ........... | 96/154 |
| 2002/0062740 A1 | * | 5/2002 | Brukov et al. ................ | 96/153 |
| 2003/0089092 A1 | * | 5/2003 | Bause et al. .................. | 55/524 |

FOREIGN PATENT DOCUMENTS

| | | | |
|---|---|---|---|
| EP | 0060677 A1 | * | 9/1982 |
| WO | WO 88/06093 A1 | * | 8/1988 |

OTHER PUBLICATIONS

Rando Product Improvement Bulletin, Oct., 1993 for "Rando Webber w/Split-Air Option" Rando Machine Corporation of Macedon, NY 14502.

* cited by examiner

Primary Examiner—Robert H. Spitzer
(74) Attorney, Agent, or Firm—Brooks Kushman P.C.

(57) ABSTRACT

Non-shedding light duty fibrous filter material containing activated carbon and/or other sorbtive granules is disclosed having a thickness of ⅛ inch to ⅜ inch and composed entirely of low melt fibers of 4 to 15 denier. Heavy duty filter material, also of a non-shedding clean character, is of ¾ to 1 inch thickness and comprises a mixture of 70% structural fibers and 30% low melt fibers.

12 Claims, 2 Drawing Sheets

FILTER MATERIAL AND METHOD OF MAKING SAME

BACKGROUND OF THE INVENTION

1. Field of the Invention

This invention relates to filter material for use in removing by adsorption or absorption (sorbtion) undesirable matter from a fluid stream which passes through the filter material. Also disclosed are methods of making the filter material in a production setting.

2. Background Art

This application incorporates by reference U.S. Pat. Nos. 5,338,340 and 5,569,489.

In U.S. Pat. No. 5,569,489, I have disclosed methods of making filter material wherein sorbent particles or granules are incorporated into a fibrous mat during the formation of the mat. Further experimentation with such methods of making filter material has enabled me to make improvements in the methods which have resulted in the ability to produce in a production setting a wide variety of filter material ranging from about one inch in thickness for heavy duty applications down to about one-eighth inch thickness for light duty applications and wherein the sorbtive particles are retained in the mat without resorting to covering opposite faces of the mat with a layer of adhesive, thereby avoiding a high delta in pressure drop across the filter material.

Before development of the methods disclosed herein, in order to prevent the sorbtive particles, for example activated carbon, from falling out of the mat, opposite faces of the mat would be sprayed or roll coated with adhesive. While this helped lock the sorbtive particles in the mat, though not as completely as desired, it caused a high pressure drop rendering the product unacceptable for some applications. The failure to lock the particles in the mat completely, rendered the mat "dirty", i.e., not clean enough for some applications.

SUMMARY OF THE INVENTION

I have found that a very effective light duty filter may be made having a thickness of between ⅛ inch to ⅜ inch composed entirely of low melt fibers of a 4 to 15 denier with sorbtive particles distributed uniformly through the web or mat and being of a size ranging from about 20/50 to 30/80 mesh. While I mentioned in the U.S. Pat. No. 5,569,489 patent that low melt fibers might be used with structural fibers, I believe the use of solely low melt fibers in the light duty type filter is a new concept. It virtually eliminates shedding and is essentially the opposite approach of U.S. Pat. No. 5,569,489.

I have also discovered that heavy duty filter material of ¾ to 1 inch in thickness may be produced with a reduction in pressure drop across a filter made with such material of between 30% to 50% as compared with prior heavy duty filters. This is the result of using a mixture of 70% structural fibers and 30% low melt fibers, and then heating the mat to cause adhesion of the low melt fibers to the structural fibers and the sorbtive particles. As the material cools it may be rolled up for storage and transport, and then unrolled and cut to size for use.

To accomplish the manufacture of these and other filter material, I introduce the sorbtive particles into an air stream containing the fibers at an area where the air stream is expanding and just before a condensing roll. Penetration of the particles into the fiber mat will vary with the amount of air; as the amount of air flow is increased until a point is reached where any further increase will reduce penetration and therefor by varying the air flow the depth of particle penetration may be varied.

Also, by varying the location of the point of introduction of the sorbtive particles, i.e., closer to or farther from the condenser roll, the amount of sorbtive particles taken up by the mat and the distribution within the mat can both be varied.

DETAILED DESCRIPTION OF THE PREFERRED EMBODIMENT(S)

Figure 1:
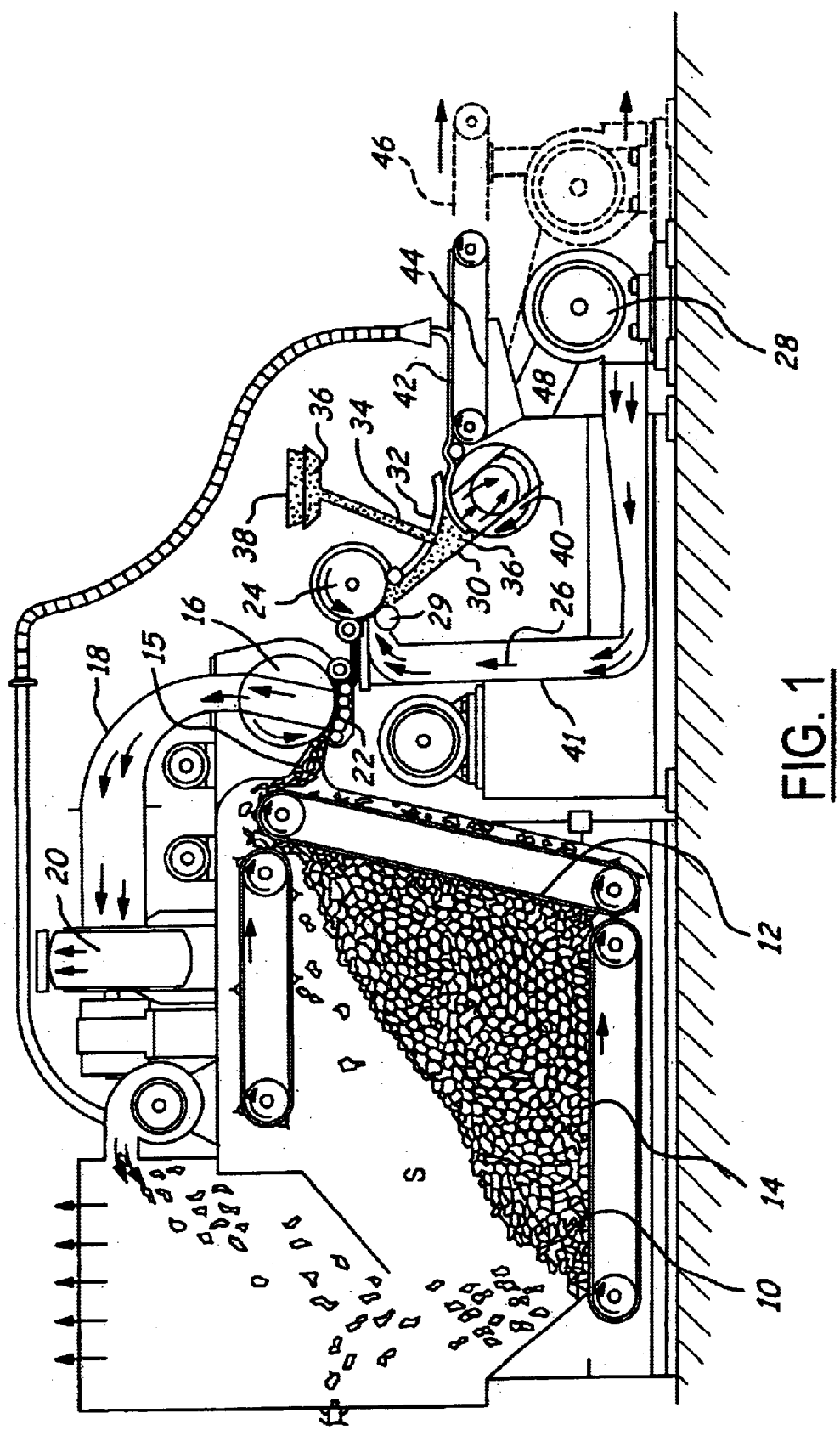
FIG. 1 is a schematic side view of apparatus for making the filters described in this disclosure.

In FIG. 1, apparatus is schematically shown for making filter material as described herein and comprises a chamber S containing a quantity of non woven random fibers 10. These fibers 10 are moved toward a conveyor 12 by a conveyor 14. Conveyor 12 moves the fibers upwardly where they sweep across an air bridge 15 and against a feed mat condenser screen 16 against which they are drawn by a partial vacuum in a suction pipe 18 connected to the suction side of an air pump 20. At the condenser 16 the fibers are matted at 22 and the matt passes to a lickerin 24 where it encounters an air stream 26 provided by air pump 28. At the lickerin 24 the fibers enter the air stream 26 at the saber 29 and pass downwardly at an angle through the venturi duct 30 beneath the duct cover 32. At the lickerin 24 the fibers in the mat formed at the condenser screen 16 are separated and fly as individual fibers into the venturi duct 30. Details of construction and operation of the apparatus as thus far described are obtainable from Rando Machine Corporation, 1071 Rt. 31, The Commons, Macedon, N.Y., 14502-0614, with specific reference to the Model B Rando-Web process.

According to the invention disclosed herein, the fibers moving down through the venturi duct 30 mix with the sorbent particles or granules 36 delivered by a sorbent delivery duct 34 from the vibrating storage chamber or hopper 38. The delivery duct 34 opens through the venturi duct cover 32 into the venturi duct 30 so that sorbent particles or granules 36, such as activated carbon, in the storage hopper 38, will travel down the duct 34 and mix uniformly with the fibers 10 in the air stream within the venturi duct. The duct 34 is as wide as the fiber batt or mat 42 being formed so that the sorbent particles or granules will be deposited across the entire width of the mat.

The air stream with entrained fibers and sorbent particles or granules is directed against the condenser roll 40 where the fibers and sorbent particles or granules are formed into a mat 42. The condenser roll has a foraminous surface and the interior of the roll is connected by a duct 48 to the suction side of the air pump 28 or fan. The air from the expulsion side of the pump 28 is shown at 26 within the air pipe 41 leading back to the lickerin 24. From the condenser roll 40 the mat moves onto a takeaway conveyor 44. From the takeaway conveyor the mat 42 may pass to another conveyor shown in phantom outline at 46 which conveys the mat to an oven (not shown) for setting the fibers and/or any other operation it is desired to perform, such as cutting to length and rolling the mat to facilitate handling. As all of the mats described herein involve the use of low melt fibers, either alone or in combination with structural fibers, moving the mat to an oven for heating the low melt fibers is an important part of the process.

Low melt fibers suitable for the manufacture of the filter material herein described may be obtained from Kanematsu U.S.A., Inc. of Los Angeles, Calif. In particular, 15 denier ×51 mm Polyester staple Fiber has been found to be quite satisfactory in combination with a Structural Fiber made by Martin Color-fi, Inc of Edgefield, S.C. under part number 2007010150. This particular structural fiber is available as a 200 denier 1.5 inch long black polyester.

Figure 2:
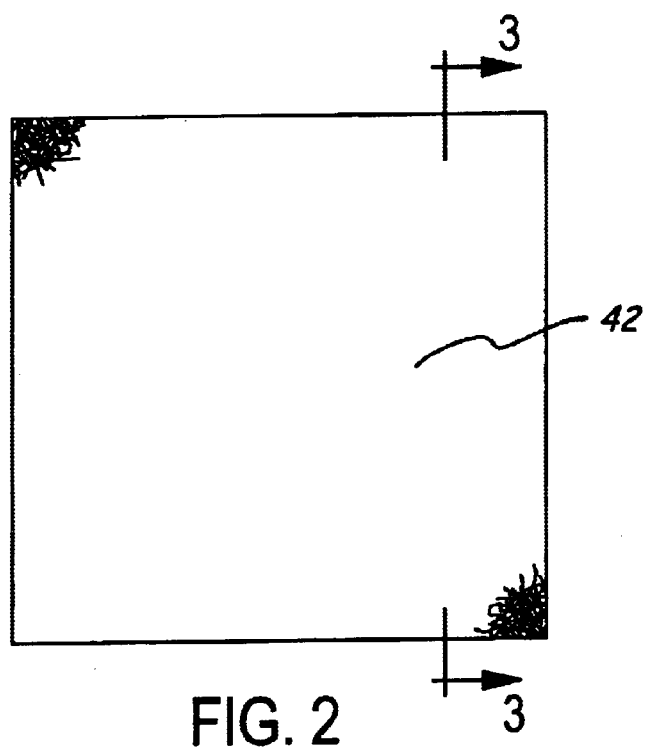
FIG. 2 is a plan view of light duty filter material.
Figure 3:
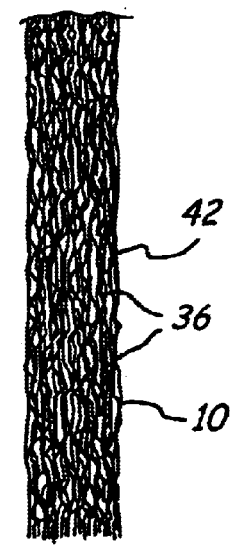
FIG. 3 is a cross-sectional view taken on the line 3—3 of FIG. 2.

I have found that extremely effective filter material for light duty applications may be made using 20/50 mesh activated carbon particles with a loading of from 5 to 10 grams per square foot up to about 90 grams per square foot, and a pad thickness of from one eighth of an inch to three eighths of an inch. Preferably about a 50/50 blend of (1) a 15 denier low melt fiber and (2) a 4 denier low melt fiber is used for the mat. FIGS. 2 and 3 represent somewhat schematically a light duty fibrous mat made as herein described, with the sorbent particles or granules shown at 36 and the fibers at 10. (The 15 denier fiber may be a white low melt fiber.) These products are rollable which is desirable for many filter applications and if the carbon loading does not exceed between about 60 to 90 grams per square foot, the material may be pleated. The success in pleating will depend upon the number of pleats desired per unit distance and how sharp the bends are.

Of course, the filter material is treated with heat during its fabrication so that the low melt fibers will bond or coalesce to each other and to the sorbtive particles to hold the particles in the mat. The pressure drop across the filter material is much less than filter materials made by impregnation with adhesive as in the prior art, such as by spraying both sides of the mat or roll coating it with adhesive in an effort to lock the fibers together and the sorbtive particles in the mat. In addition I have found that the filter material as above described is much cleaner, i.e., the sorbtive particles are retained in the mat rather than falling out when the mat is rolled, pleated or placed in operation in a filter. This is the result of the low melt fibers locking the fibers together and trapping the carbon particles in the interstices of the mat. This is particularly true of the thin or light duty filter material. I have found that by using entirely low melt fibers in the thin and light duty applications where all of the fibers are bonded together, the filter material is quite clean.

In those materials where there is very little carbon, such as where 5 to 10 grams of carbon are used per square foot, if a small amount of 15 denier structural fiber is used in combination with low melt fibers, for example up to about 33% of structural fibers, such opens the mat up thereby increasing the air flow while maintaining a clean, non-shedding product.

Figure 4:
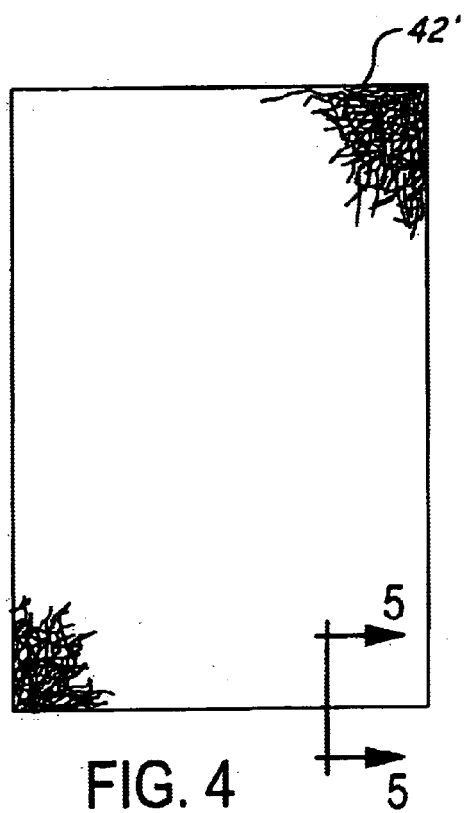
FIG. 4 is a plan view of a heavy duty filter material.
Figure 5:
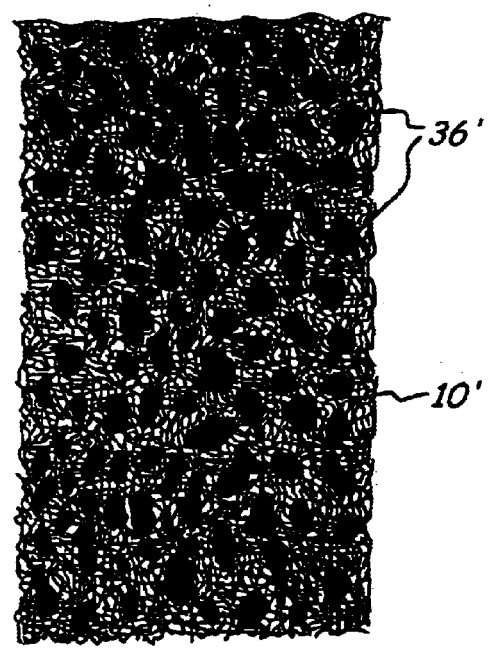
FIG. 5 is a cross-sectional view taken on the line 5—5 of FIG. 4.

For heavier duty applications larger mesh sorbtive particles are used, such as 6/12 granular carbon, at loadings of 300 grams per square foot. Such a filter material is shown in FIGS. 4 and 5 where the sorbent particles or granules are shown at 36' and the fibers at 10' and the mat at 42'. Pad thicknesses may be varied from ⅞ths inch+/−⅛th of an inch. The pad or mat is made of 70% 200 denier structural material with 30% 15 denier low melt fiber, and the low melt fiber is heated when the pad is made up to lock the structural fibers and low melts together and thereby retain the sorbtive particles in the pad or mat. Mats of 150 or 100 grams per square foot can be made, but with 6/12 carbon it would be dispersed so widely that it would be a rather ineffective product when compared to the 200 and 300 gram per square foot products.

While mats made by spraying opposite sides of the mat or roll coating with adhesive to lock the carbon granules in position in the mat were effective to reduce shedding of particles from the mat, such was not clean enough for many applications and the pressure drop was often unacceptably high. Manufacturing the pad or mat as described herein using a percentage of low melt fibers, the pressure drop has been reduced from 30% to 50% and essentially no shedding is present.

I have used a 100 denier structural fiber and a 15 denier low melt in a blend of a 70/30 ratio and found I could not hold 300 grams per square foot without the carbon granules shedding out of the mat. However, a loading of 100 to 200 grams per square foot may be held by this fiber denier blend. It appears that the larger denier fibers are needed to create the "holes" for the carbon granules.

To remove odors from an air stream passing through the filter mat, impregnated carbons would be a family of sorbtive particles that may be used. Activated alumina impregnated with potassium permanganate another, and ZEOLITES and other sorbtive particles may be utilized as above described for carbon granules alone.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. Fluid filter material capable of being rolled comprising:
    a fiber web of structural fibers having substantially uniformly distributed there through sorbtive particles of a size ranging from about 6/8 mesh thru 12/28 mesh and a loading of from about 100 to 400 grams per square foot; and
    said web including low melt fibers adhered to the structural fibers and to the sorbtive particles and coalesced with each other providing a more open structure for increased air flow.

2. Fluid filter material for light duty applications comprising:
    a fiber web of between about ⅛ inch to ⅜ inch thickness and composed substantially entirely of low melt fibers of 4 to 20 denier;
    sorbtive particles distributed substantially uniformly through the fiber web and being of a size ranging from about 20/50 to 30/80 mesh;
    the sorbtive particle loading lying in the range from about 5 grams per square foot to about 90 grams per square foot; and
    said low melt fibers having been heated to adhere to each other and to said sorbtive particles to retain the particles in position in the fired web all without the use of adhesives.

3. The fluid filter material of claim 2 wherein the low melt fibers comprise about a 50/50 blend of (1) a 15 denier fiber and (2) a 4 denier fiber.

4. A low sorbtive particle fluid filter comprising:
   a fibrous mat having between about 5 to 12 grams of sorbtive particles per square foot; and
   said fibrous mat consisting of up to about 33% of 15 denier structural fibers with the balance being low melt fibers.

5. A light duty fluid filter material comprising, in combination:
   a fiber web of from about ⅛" to about ⅜" thickness consisting entirely of low melt fibers of 4 to 15 denier;
   sorbtive particles of a size ranging from about 20/50 to 30/80 mesh distributed uniformly through the web; and
   said low melt fibers having been heated sufficiently to cause the fibers to adhere to each other around the particles forming interstices trapping the particles therein after the fibers are cooled.

6. The filter material of claim 5 wherein the heating of the low melt fibers is sufficient to cause the fibers to adhere to the particles helping to retain particles in position in the web after the fibers are cooled.

7. A fluid filter comprising, in combination:
   a fiber web of from about one-inch thickness for heavy duty applications to about ⅛-inch thickness for light duty applications; said web formed of about 70% 200-denier structural fibers and about 30% 15-denier low melt fibers for heavy duty applications, down to about a 50/50 mixture of about 15-denier low melt fibers and about 4-denier low melt fibers for light duty applications;
   sorbtive particles distributed through the fiber web ranging from about 300 grams per square foot of 6/12 mesh for heavy duty applications to about 5 grams per square foot at 20/50 mesh for light duty applications; and
   wherein the low melt fibers have been heated to cause the lower denier fibers to coalesce with each other for light duty applications and also with each other and with the structural fibers for heavy duty applications, thereby providing a more open structure for improved air flow for both heavy and light duty applications and entrapment of the sorbtive particles in the interstices of the structure, all without the use of adhesives.

8. The filter material of claim 7 characterized in that for light duty applications the web ranges from about ⅛ inch to about ⅜ inch.

9. The filter material of claim 8 characterized in that for light duty applications the sorbtive particles loading lies in the range from about 5 grams per square foot to 90 grams per square foot.

10. The filter material of claim 7 wherein the particles are activated carbon.

11. The filter material of claim 7 wherein for heavy duty applications the sorbtive particle loading ranges from about 300 grams per square foot to about 100 grams per square foot, and the sorbtive particles size range from 6/8 to 12/28 mesh.

12. The filter material of claim 7 wherein for heavy duty applications the web thickness ranges from about ¾ inch to one inch plus or minus ⅛ inch.

* * * * *